United States Patent
McLeod

(10) Patent No.: US 9,097,582 B2
(45) Date of Patent: Aug. 4, 2015

(54) AMBIENT LIGHT SENSING SYSTEM AND METHOD

(71) Applicant: STMicroelectronics (R&D) Ltd., Buckinghamshire (GB)

(72) Inventor: Stuart McLeod, Linlithgow (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 430 days.

(21) Appl. No.: 13/669,119

(22) Filed: Nov. 5, 2012

(65) Prior Publication Data
US 2013/0112855 A1    May 9, 2013

(30) Foreign Application Priority Data
Nov. 9, 2011   (GB) .................................. 1119334.9

(51) Int. Cl.
G01J 1/44 (2006.01)
G01J 1/42 (2006.01)
F21V 23/04 (2006.01)
G01J 3/51 (2006.01)
G01J 1/04 (2006.01)

(52) U.S. Cl.
CPC ............. *G01J 1/42* (2013.01); *F21V 23/0464* (2013.01); *G01J 1/0407* (2013.01); *G01J 1/0418* (2013.01); *G01J 1/0488* (2013.01); *G01J 1/4204* (2013.01); *G01J 1/44* (2013.01); *G01J 3/513* (2013.01)

(58) Field of Classification Search
CPC . G01J 1/4204; F21V 23/0464; F21V 23/0471
USPC ...... 250/208.2, 214 AL, 214 B, 214 C, 338.1, 250/338.4, 551; 356/614, 622
See application file for complete search history.

(56) References Cited

U.S. PATENT DOCUMENTS

| | | | |
|---|---|---|---|
| 2010/0102230 A1 | 4/2010 | Chang et al. | |
| 2011/0068255 A1 | 3/2011 | Zheng et al. | |
| 2012/0133799 A1* | 5/2012 | Findlay | 348/241 |
| 2012/0133955 A1* | 5/2012 | Baxter | 356/614 |

FOREIGN PATENT DOCUMENTS

| | | |
|---|---|---|
| GB | 2456771 A | 7/2009 |
| WO | WO 2008/009770 A1 | 8/2008 |

OTHER PUBLICATIONS

Great Britain Search Report dated Dec. 19, 2011 from corresponding Great Britain Application No. 1119334.9.

* cited by examiner

*Primary Examiner* — Kevin Pyo
(74) *Attorney, Agent, or Firm* — Gardere Wynne Sewell LLP

(57) ABSTRACT

A sensor for range finding and ambient light measurement wherein the sensor includes an array of pixels capable of sensing illumination in a plurality of wavelengths and generating a response thereto for each wavelength; the sensor including an ambient light sensing system which includes a module for adjusting the response from the ambient light sensor, such that the response for each wavelength is independent of the wavelength of the illumination.

26 Claims, 8 Drawing Sheets

AMBIENT LIGHT SENSING SYSTEM AND METHOD

CROSS REFERENCE TO RELATED APPLICATIONS

This application claims the priority benefit of Great Britain patent application number 1119334.9, filed on Nov. 9, 2011, which is hereby incorporated by reference to the maximum extent allowable by law.

BACKGROUND

1. Technical Field

The present disclosure relates to an improved ambient light sensing system and method, for use in a sensor such as a single photon avalanche diode (SPAD).

2. Discussion of the Related Art

A SPAD is based on a p-n junction device biased beyond its breakdown region. The high reverse bias voltage generates a sufficient magnitude of electric field such that a single charge carrier introduced into the depletion layer of the device can cause a self-sustaining avalanche via impact ionization. The avalanche is quenched, either actively or passively to allow the device to be "reset" to detect further photons. The initiating charge carrier can be photo-electrically generated by means of a single incident photon striking the high field region. It is this feature which gives rise to the name 'Single Photon Avalanche Diode'. This single photon detection mode of operation is often referred to as 'Geiger Mode'.

A SPAD array is used in mobile phones, communication devices and computers for a number of different sensor functions. These functions include ranging functions, ambient light sensing and a variety of other functions.

In respect of ambient light sensing there are a number of different types of light conditions which must be dealt with. For example, the different types of light may include daylight, fluorescent light, incandescent light etc.

Each different type of light emits at a different frequency spectrum and the
response of the sensor, such as a SPAD, is different at different incident frequency spectra. This results in an ambient light response which varies depending on the type of light being compensated for. Ideally the response, from a user point of view, should be the same for the same levels of light (LUX) irrespective of the frequency or wavelength spectrum.

In addition, where a sensor is being used for multiple functions, such as range finding and ambient light sensing the sensor may operate in both the optical and infrared spectra. As a result, the sensor may detect ambient light in still further frequency ranges which again give rise to different responses.

SUMMARY

Some embodiments overcome at least some of the problems associated with the prior art.

Some embodiments make use of sensors in new applications and circumstances.

One embodiment provides a sensor which responds to all different types of light with the same or a similar response.

One embodiment uses a sensor such as a SPAD as a solid state photo-detector for ranging, proximity detection, accelerometry, ambient light sensing, etc., where any light sensing has the same response irrespective of the type of incident light.

Embodiments provide a method and system as set out in the accompanying claims.

According to one embodiment there is provided a sensor for range finding and ambient light measurement wherein the sensor includes an array of pixels capable of sensing illumination in a plurality of wavelengths and generating a response thereto for each wavelength; the sensor including an ambient light sensing system which includes a module for adjusting the response from the ambient light sensor, such that the response for each wavelength is independent of the wavelength of the illumination.

In one embodiment, the module includes:
a subtraction module for calculating a difference between a first and second response at different wavelengths generated by the array of pixels to produce a first output;
a division module for calculating a ratio of the first and second responses;
an interpolation module for applying gain and offset to the ratio of the first and second responses to produce a second output; and
a multiplication module for multiplying the first and second outputs to normalize the first and second responses, such that they are independent of the wavelength of the illumination.

Optionally, the first and second responses relate to responses of the ambient light sensor to illumination at different wavelengths.

Optionally, the first and second responses are substantially similar for similar levels of illumination irrespective of the wavelength of the illumination.

Optionally, the array of pixels includes an array of single photon avalanche diodes (SPAD).

Optionally, the array of single photon avalanche diodes comprise IR responsive single photon avalanche diodes.

Optionally, the array of single photon avalanche diodes comprise visual light responsive single photon avalanche diodes.

Optionally, at least some of the diodes are attenuated.

Optionally, the diodes are attenuated by being covered by an opaque metal cover.

According to another embodiment, a device is provided having a sensor for range finding and ambient light measurement wherein the sensor includes an array of pixels capable of sensing illumination in a plurality of wavelengths and generating a response thereto for each wavelength; the sensor including an ambient light sensing system which includes a module for adjusting the response from the ambient light sensor, such that the response for each wavelength is independent of the wavelength of the illumination.

Optionally, the device is a phone.
Optionally, the device is a personal communications device.
Optionally, the device is a computer.
Optionally, the device is a camera.
Optionally, the device is a mouse.

According to another embodiment, there is provided a method of operating a sensor for range finding and ambient light measurement is provided wherein the sensor includes an array of pixels capable of sensing illumination in a plurality of wavelengths and generating a response thereto for each wavelength; the sensor including an ambient light sensing system; wherein the method comprises the step of adjusting the response from the ambient light sensor, such that the response for each wavelength is independent of the wavelength of the illumination.

Optionally, the step of adjusting the response comprises:
calculating a difference between a first and second response generated by the array of pixels at different wavelengths to produce a first output;

calculating a ratio of the first and second responses;

applying gain and offset to the ratio of the first and second responses to produce a second output; and multiplying the first and second outputs to normalize the first and second responses such that they are independent of the wavelength of the illumination.

Optionally, the method further comprises the step of generating each of the first and second responses of the ambient light sensor with illumination at different wavelengths.

Optionally, the method further comprises the step of generating an output wherein the first and second responses are substantially similar for similar levels of illumination irrespective of the wavelength of the illumination.

BRIEF DESCRIPTION OF THE DRAWINGS

Reference will now be made, by way of example, to the accompanying drawings, in which.

DETAILED DESCRIPTION

Figure 1:
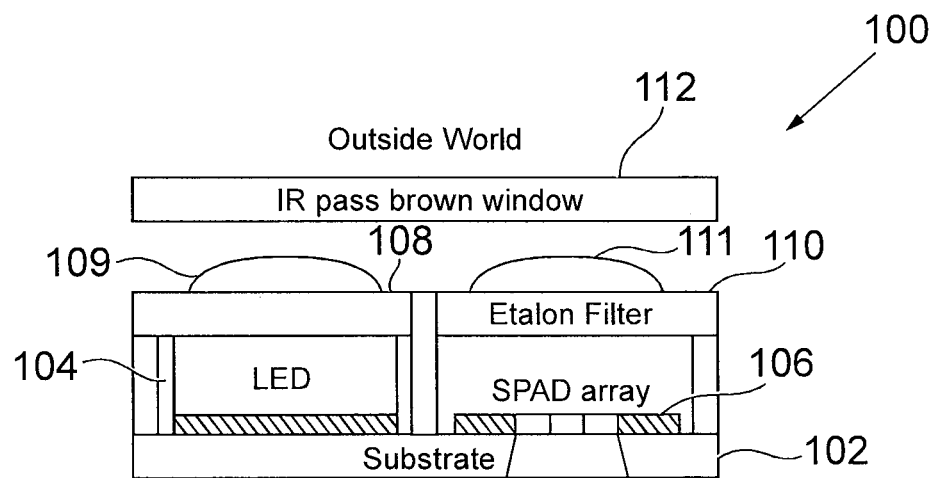
FIG. 1 is a cross-sectional view of a sensor, in accordance with an embodiment.

Referring to FIG. 1, a sensor device 100 in accordance with one embodiment is shown. The sensor device is intended to operate in a range finding function in an infrared wavelength, and an ambient light sensing function in any appropriate wavelength. The sensor device 100 includes a substrate 102 which supports a light emitting diode 104 which emits light in the IR range. The IR wavelengths are used for the range finding function and the illumination from the LED hits a target and is returned to a sensor for detection and to enable a distance or range to be determined. The sensor is in the form of a SPAD array 106 which is adapted to detect illumination in the IR domain and also in the optical domain, as will be described in greater detail below. Both the LED and the SPAD array include respective filters 108 and 110. The filter associated with a SPAD array is an interference filter. The LED needs a lens but does not need a filter per se. The interference filter has a wide band pass in the visible range and narrow band pass which corresponds to the preferred wavelength of the LED, for example 850 nm. In addition, the sensor device 100 includes an IR pass brown window 112 which allows 1-2% of the visible spectrum and approximately 75% of the IR spectrum to pass. The brown window is typically an inked glass absorption filter and is used to ensure the LED light is invisible to a mobile phone user.

Figure 2:
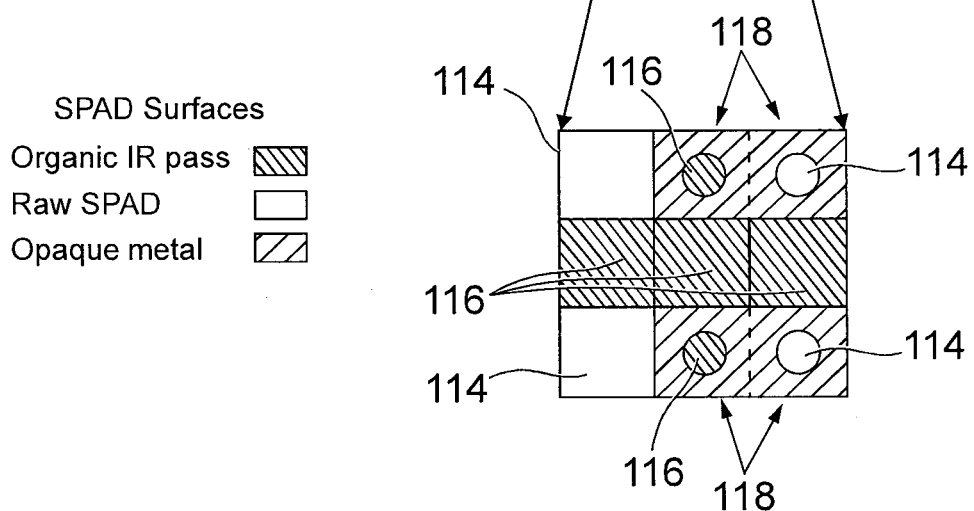
FIG. 2 is a top view of a SPAD array located within the sensor of FIG. 1, in accordance with an embodiment.

FIG. 2 shows a top view of a section of the SPAD array 106. The section shown includes 9 SPAD pixels of two different types. The first type of SPAD pixels 114 are shown in the four corners of the array and are used as ambient light sensing pixels which operate in any appropriate wavelength range. The second type of SPAD pixels 116 are organic IR SPAD pixels which operate in the IR wavelength range and are used in the range finding function of the sensor device. The SPAD pixels 118 are attenuated by means of metal apertures, such that only $\frac{1}{10}$th of the possible illumination falls on the pixel. The attenuated pixels are used in situations of high illumination where saturation of the non-attenuated pixels would occur too quickly. Lenses 109 and 111 respectively concentrate the LED output into a narrow beam and narrow the acceptance angle of the SPAD array. The LED beam and SPAD acceptance angle may be of the order of about 40-60 degrees.

The array shows just 9 pixels but could be any appropriate size with any appropriate combination of pixel types and levels of attenuation.

In use, the LED outputs a beam of IR radiation which strikes the target and returns to the SPAD array 106. The SPAD array then measures the range or distance of the target by taking into account the time taken for the radiation to go from the LED to the SPAD array. The SPAD pixels 114 are used to measure ambient light levels at different frequency ranges. Where light conditions are particularly high the measurements may be taken from the attenuated pixels 118 rather than the equivalent non-attenuated pixels 114 and 116. The ambient light measures are used to apply compensation to the display of the device on which the sensor device is mounted so that the user can see the screen, keyboard or any other user input or output devices irrespective of light conditions.

An important factor in the various measurements effected by the SPAD array is the response of the SPAD to different wavelengths, filter levels and the like. This is particularly the case with ambient light measurement. This will now be discussed in more detail.

Figure 3:
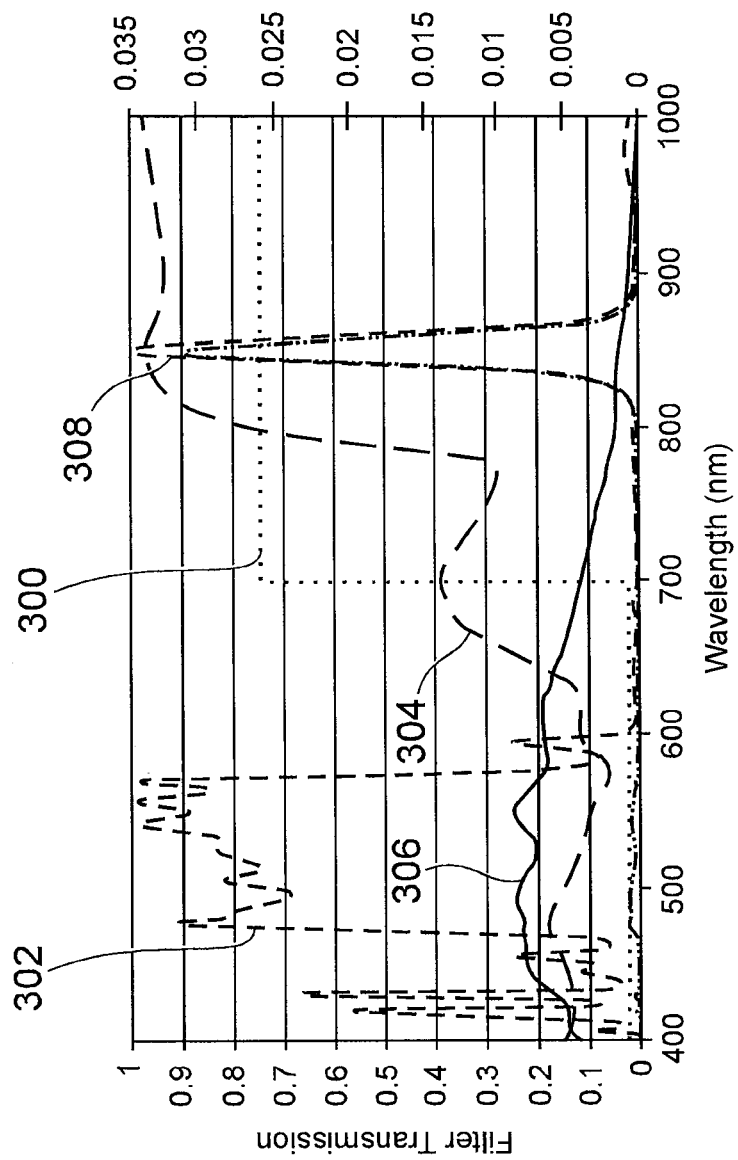
FIG. 3 is a graph of IR only SPAD response, in accordance with an embodiment.
Figure 3:
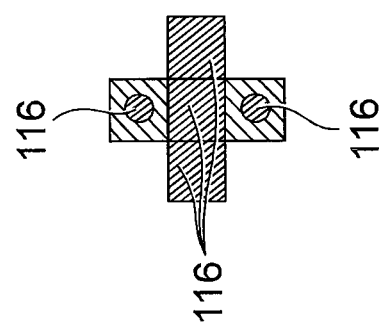

Referring to FIG. 3, the SPAD response of the "IR only" SPADs are shown. The graph shows the response of filter transmission on the left hand X-axis and the resultant transmission on the right hand X-axis, where 1 is 100% against wavelength in nm on the Y-axis. The different curves relate respectively to the transmission through the brown window 300; the etalon filter 302; the resist 304; the response of the SPAD 306; and the IR SPAD response 308. The curve 308 shows the transmission of the IR radiation on the IR only SPADs. The peak transmission is of the order of 3% at 850 nm which aligns with the preferred 850 nm transmission spectrum of the LED. The transmission properties of the interference filter peaks in the 400 to 700 nm window are of the order of about 0.1% when combined with other filters. This provides resilience to ambient light and improves the signal-to-noise ratio (SNR) for ranging functions in the IR SPADs.

Figure 4:
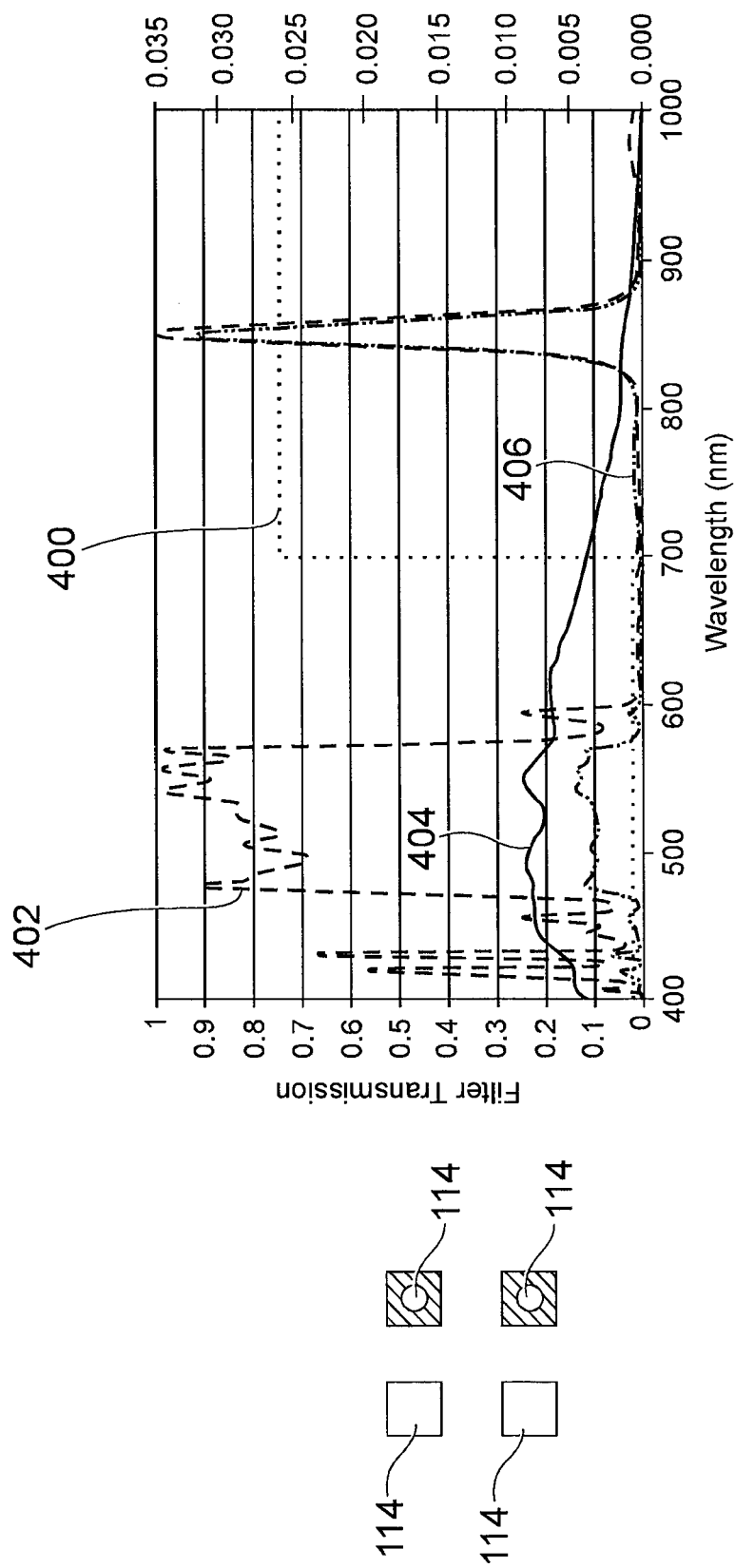
FIG. 4 is a graph showing ambient sensing SPAD filtering, in accordance with an embodiment.

FIG. 4 shows a similar graph to FIG. 3 for the ambient sensing SPAD pixels. In this graph the curves relate to the brown window 400; the interference filter 402; the SPAD response 404; and the ambient light sensing SPAD response 406. From this graph the ambient light sensing SPAD response 406 again includes a peak transmission of approximately 3% at 850 nm. However in the optical range between 400 and 700 nm, the etalon peaks are of the order of 1% which is approximately 10 times higher than in the IR only SPAD example of FIG. 3. Transmission in the IR domain is still predominant, but optical transmission is more significant than the IR only situation of FIG. 3.

Figure 5:
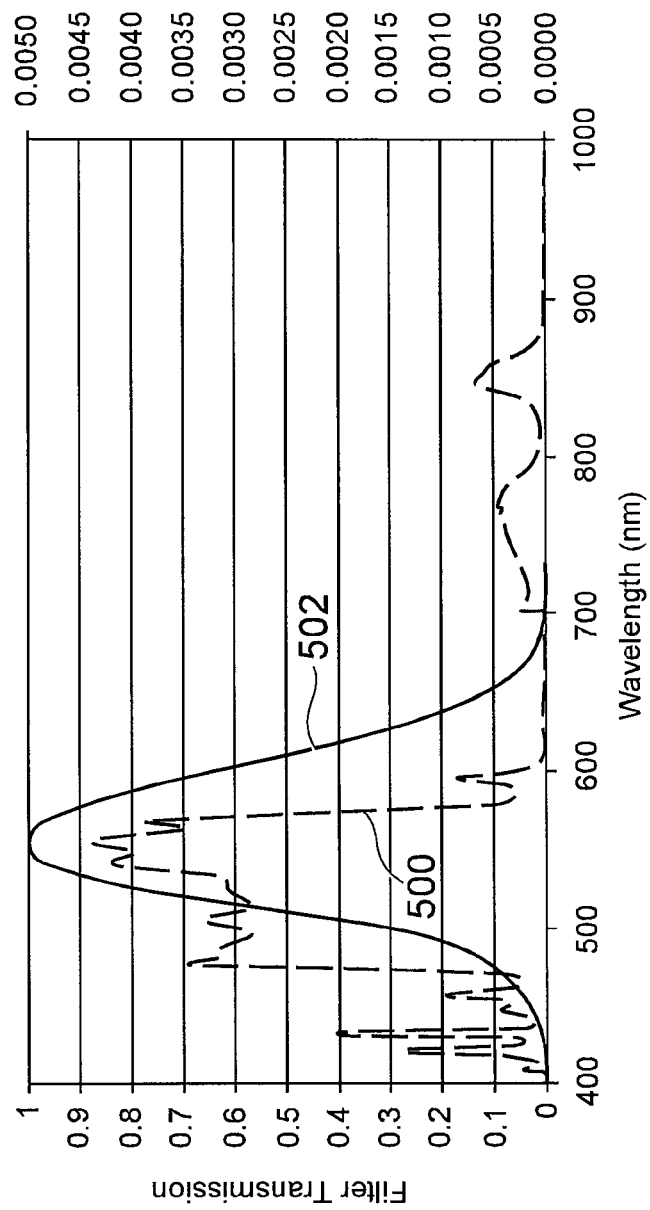
FIG. 5 is a graph showing ambient subtraction of ambient light sensing in the IR domain only, in accordance with an embodiment.
Figure 5:
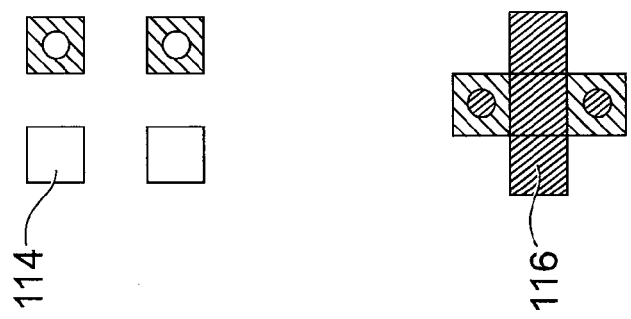

The next stage of the process is to undertake a subtraction process with respect to the SPAD response in FIGS. 3 and 4. FIG. 5 shows the result of this subtraction process and compares the ambient subtraction response 500 with the typical photopic response 502 of the human eye. The subtraction curve 500 removes the IR dominance in the ambient light sensing SPADs and shows the ambient light sensing response is more sensitive to blue light when compared with the human photopic response 502.

Figure 6:
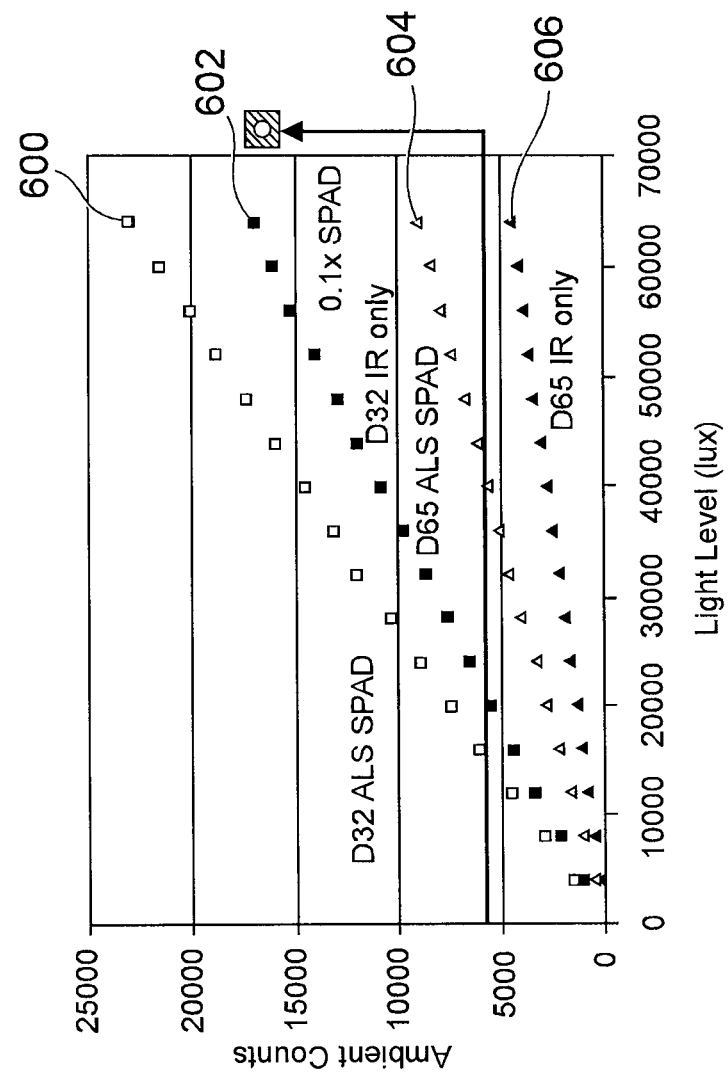
FIG. 6 is a graph showing ambient response for different types of light, in accordance with an embodiment.
Figure 6:
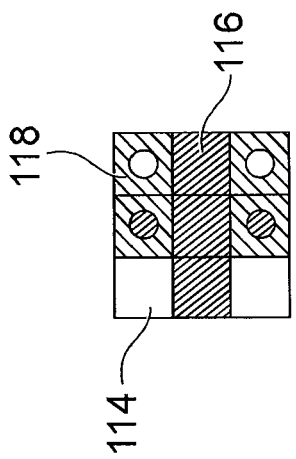

The ambient response of a SPAD may be measured by means of the number of ambient counts for each SPAD pixel in the array over a predetermined time period. FIG. 6 shows this ambient count level relative to the level of light as measured in Lux. FIG. 6 shows the response for different types of light and for the different types of SPAD pixel 114 or 116. Light type D 32 relates to incandescent light whilst D 65 indicates the response to daylight. The response for both the ambient light sensing SPAD and the IR only SPAD is shown for each light type. The curves are respectively D 32 ambient light sensing SPAD 600; D32 IR only 602; D 65 ambient light sensing SPAD 604; and D 65 IR only 606. It should be noted that above 46000 Lux the attenuated SPAD pixels are used for the measurements due to the high light levels. Similarly below 46,000 Lux the non-attenuated SPAD pixels are used. From the graph it can be seen that different types of SPAD pixel respond differently to different types of light irrespective of the light level measurement. In incandescent light the response of IR pixels dominates the ambient light sensing pixel response. In daylight there is an equivalent response from both IR and visible responses.

The response shown in FIG. 6 is generally perceived to be unacceptable to manufacturers of telephones, computers and other personal digital assistant time devices where ambient light levels are measured in order to compensate backlighting and other functions and features of displays for better user experiences. The user would prefer the same response and thus the same compensation to be applied on the basis of light levels rather than light type and wavelengths. The present invention applies further processing to the ambient response data in order to overcome this problem.

Figure 7:
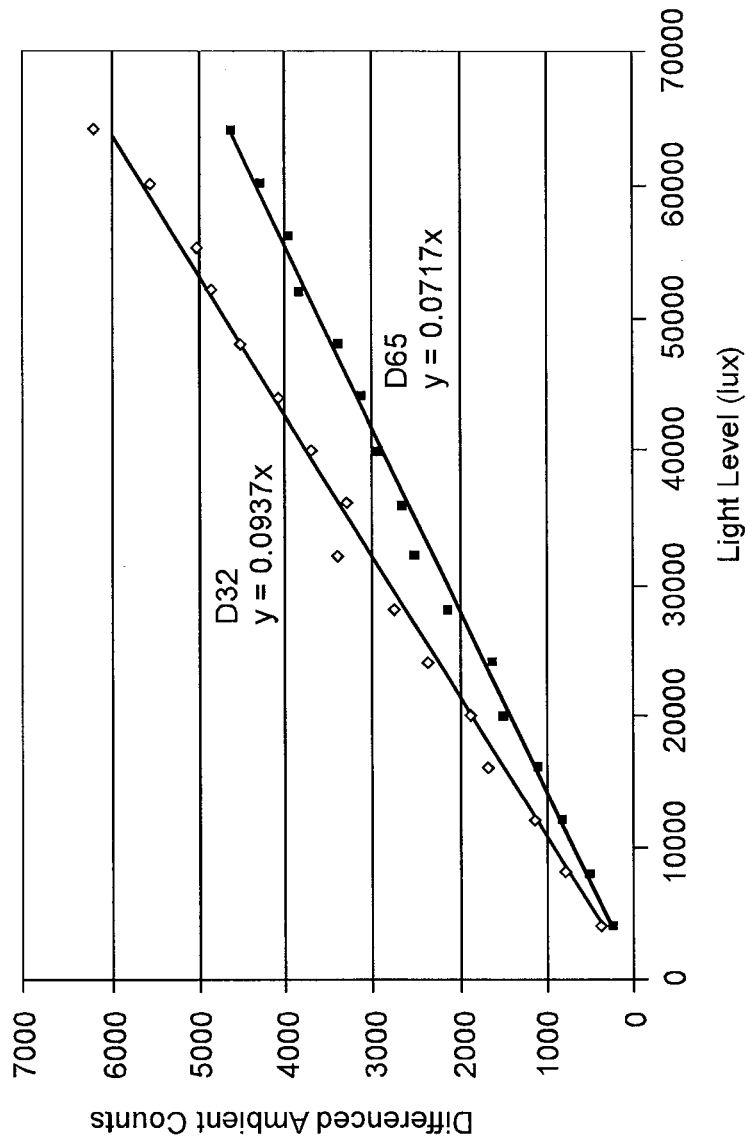
FIG. 7 is a graph showing ambient subtraction for different types of light, in accordance with an embodiment.
Figure 7:
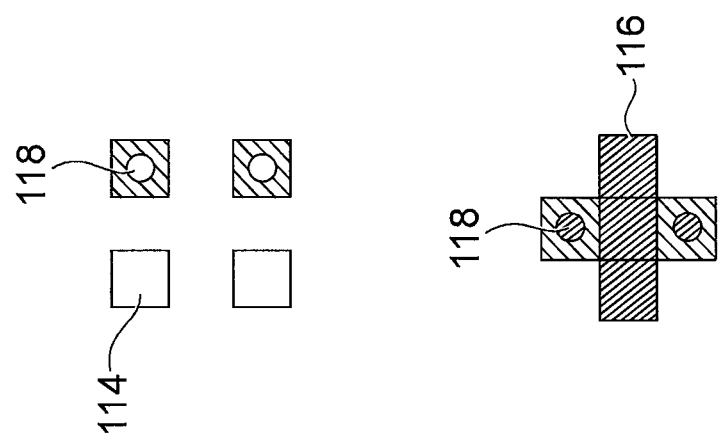

A first step of the further processing is to carry out an ambient subtraction process which removes the effect of the IR only SPAD pixels from the response for different light types. The result of this subtraction process is shown in FIG. 7. Whilst there is a general improvement between incandescent light (D 32) and daylight (D 65), there is still a difference in response between the two different light types. Incandescent light is 1.25 times more sensitive than daylight. This improvement is useful but still insufficient.

Figure 8:
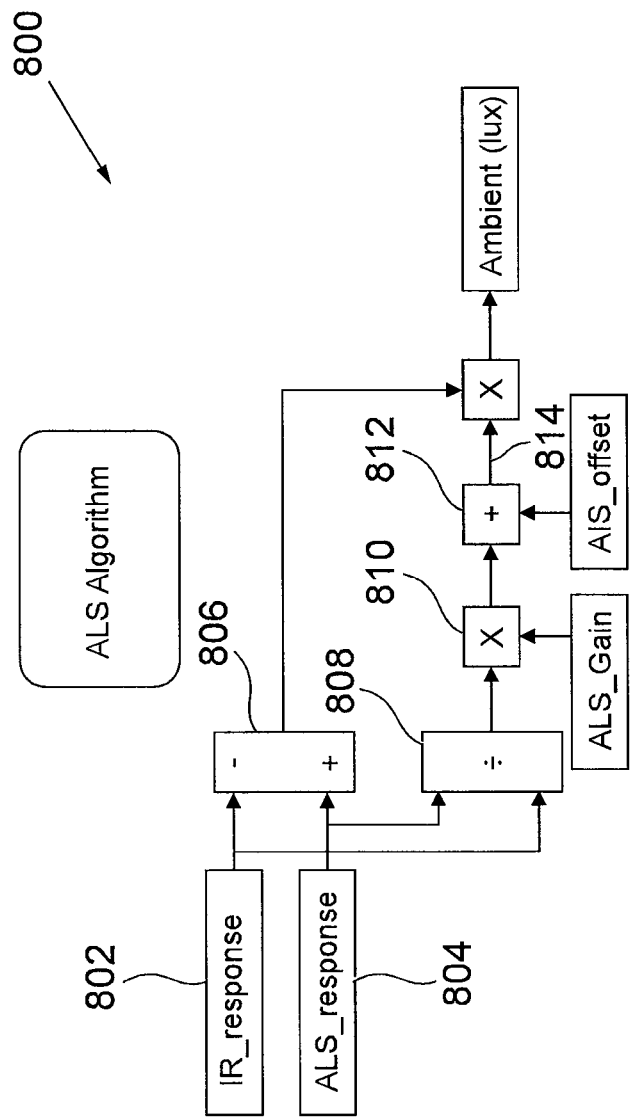
FIG. 8 is this schematic diagram showing the ambient light sensing algorithm, in accordance with an embodiment.

Referring now to FIG. 8 the present invention now applies an ambient light sensing algorithm 800 to further process the data to effect a normalization process on the data such that the different types of light respond in a substantially similar manner. The algorithm uses as its input the IR and ambient light sensing responses of FIGS. 3 and 4, respectively 802 and 804. The IR response and ambient light sensing response are processed firstly by a subtracting module 806 to produce a result equivalent to that shown in FIG. 5.

In addition, the two inputs are processed by a division module 808 where the ratio of ambient light sensing ambient count and infrared only ambient count is determined. An interpolation process or module then applies an ambient light sensing gain function 810 to the resultant output. The gain is determined by multiplying the output of the division (IR/ambient) by the ALS_gain 810 and then adding the ALS_offset 812 as shown in FIG. 8.

Figure 9:
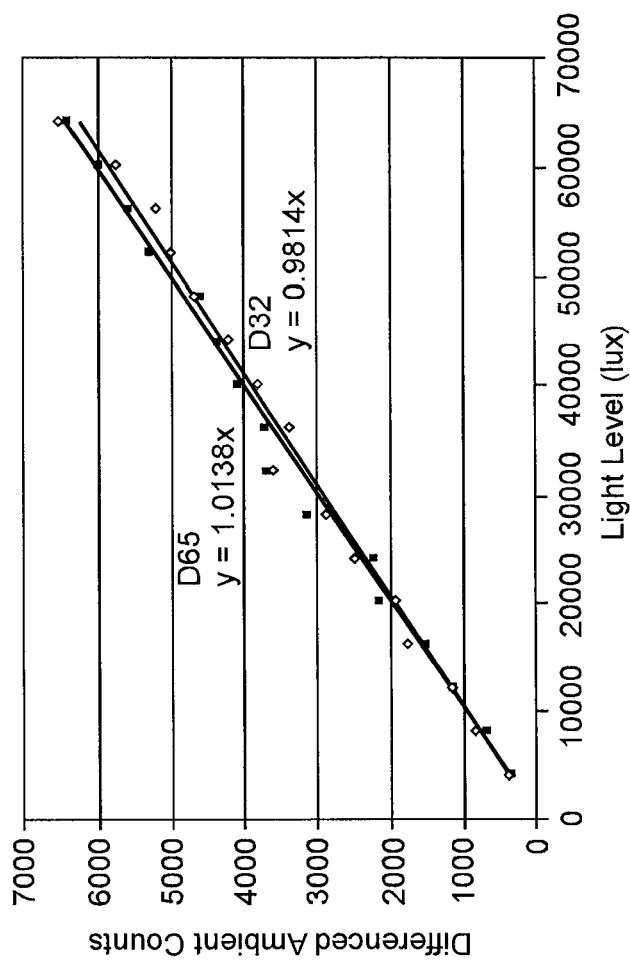
FIG. 9 is a graph of ambient normalization produced by the FIG. 8 algorithm, in accordance with an embodiment.
Figure 9:
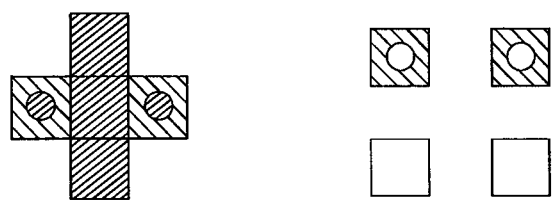

The gain 810 and offset 812 depend on the filter setup and can be determined by simulating the IR and ALS SPAD responses under different illuminants. For the system in question the ALS_gain was determined to be about 0.55 and the ALS offset was determined to be about 0.31. The offset and gain are determined by interpolating the results until their best match for different light level responses is obtained. The output from the division, gain and offset route 814 is then multiplied with the output from the subtraction module 806 to produce an ambient response that is normalized. The ambient normalized response is shown in FIG. 9 where it can be seen that daylight and incandescent light responses are substantially similar. The variation is only ±2% in terms of ambient light sensing response between the two different types of light. This produces a result which means the measured ambient light levels and associated compensation is the same for all different types of light, including but not limited to incandescent, fluorescent and daylight. The gain and offset for different types of light may vary from the values indicated above.

This system has further advantages for the user of the device, since using such an ambient light sensor, the user will perceive the same changes in backlighting etc. when in environments at a particular light level irrespective of the type of light or illumination.

Ranging can occur in a number of applications, including proximity detection which is relatively easy to implement and inexpensive; Laser ranging which is more complex and costly than a proximity detector; and three-dimensional imaging which is a high-end application that could be used to recognize gestures and facial expressions.

A typical range for a simple range finder is of the order 0.01 m to 0.5 m. In the case of laser ranging, the illumination source is a modulated diode laser and the wavelength may be visible so that the user can see what is being targeted and is typically around 635 nm. For 3D cameras a pixel array. is used in order to avoid mechanical scanning of the array. Systems can be based on a number of different architectures. Both time of flight (TOF) and modulated illuminator based architectures are used, however, the latter is more robust to ambient light and thus fits best with established photodiode construction. Additional features such as face and gesture recognition are applications of this type of ranging device.

Most optical ranging implementations use either stereoscopic, structured light, direct time of flight or phase extraction methods in order to ascertain the range to a target. Stereoscopic solutions use two conventional cameras, and can have a heavy computation overhead in order to extract range. The structured light scheme uses diffractive optics and the range is computed using a conventional camera based on how a known projected shape or matrix of spots is deformed as it strikes the target. The direct time of flight (TOF) method uses a narrow pulsed laser, with a time-digital converter (TDC) measuring the difference in time between transmission and first photon reception. Commonly, a 'reverse mode' is employed, where the TDC measures the back-portion of time, i.e. the time from first photon reception to next pulse transmission. This scheme reduces system activity to only the occasions where a photon is detected, and is therefore well matched to tightly controlled, low photon flux levels and medical applications such as fluorescent lifetime microscopy (FLIM).

The phase extraction method is probably the most commonly used method as it is well suited to systems which implement computation of the generalized range equation using existing photodiode technology. It is also robust to background ambient light conditions, and may be adapted to allow for varying illuminator modulation wave-shapes (i.e. sinusoidal or square). This scheme is favored for SPADs in proximity detection applications.

The power consumption of SPADs and their readout circuits are dependent on the incident photon arrival rate. The average power consumption of a ranging system could be reduced by using power saving modes such as pulsed on/off operation, at a rate of ~10 Hz for example, at the expense of target motion distortion.

The sensor may be implemented on a 1 mm$^2$ die size and the I2C module could also be implemented on an appropriate die. The sensor may have an optimal field of view of about 30°. As the sensor is not intended to "create an image" but is instead used to ensure that as many photons as possible are detected, the optics could be made from injection molded hemispherical elements.

The illuminator source should ideally be of a non-visible wavelength, for example in the Near Infra Red (NIR) band, such as 850 nm.

It should be noted that the terms "optical", "illumination" and "light" are intended to cover other wavelength ranges in the spectrum and are not limited to the visual spectrum.

The proximity sensor has been described with reference to a simple low cost system, although it will be appreciated that for certain applications the laser ranging and 3D camera technologies discussed above, could be used.

As previously indicated, the proximity sensor of the present invention is very versatile and can be used in a vast array of different applications.

The sensor is intended for use in an optical navigation device; however, it will be appreciated that the sensor could be used in any appropriate device, for example fingerprint reader or Lab-on-chip/Bio-Optical sensor systems (which detect chemi-fluorescence for medical and/or bio-testing applications).

The sensor may be used in any suitable devices such as a mobile or smart telephone, other personal or communications devices, a computer, a mouse, a remote controller, access modules for doors and the like, a camera or any other suitable device.

There are many variations of the present invention which will be appreciated by the person skilled in the art and which are included within the scope of the present invention.

Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A sensor for range finding and ambient light measurement wherein the sensor includes:
   an array of pixels capable of sensing illumination in a plurality of wavelengths and generating a response thereto for each wavelength;
   an ambient light sensing system which includes a module for adjusting the response for each wavelength to be independent of the wavelength of the illumination;
   wherein the module includes:
      a subtraction module for calculating a difference between a first and second response at different wavelengths generated by the array of pixels to produce a first output;
      a division module for calculating a ratio of the first and second responses to produce a second output; and
      a multiplication module for multiplying the first and second outputs to normalize the first and second responses, such that they are independent of the wavelength of the illumination.

2. The sensor of claim 1, wherein the module further includes an interpolation module for applying gain and offset to the ratio of the first and second responses in producing the second output.

3. The sensor of claim 1, wherein the first and second responses relate to responses of the ambient light sensor to illumination at different wavelengths.

4. The sensor of claim 3, wherein the first and second responses are substantially similar for similar levels of illumination irrespective of the wavelength of the illumination.

5. The sensor of claim 1, wherein the array of pixels includes an array of single photon avalanche diodes.

6. The sensor of claim 5, wherein the array of single photon avalanche diodes comprise IR responsive single photon avalanche diodes.

7. The sensor of claim 5, wherein the array of single photon avalanche diodes comprise visual light responsive single photon avalanche diodes.

8. The sensor of claim 5, wherein at least some of the diodes are attenuated.

9. The sensor of claim 8, wherein the diodes are attenuated by being covered by an opaque metal cover.

10. A device having a sensor according to claim 1.

11. The device of claim 10, wherein the device is a phone.

12. The device of claim 10, wherein the device is a personal communications device.

13. The device of claim 10, wherein the device is a computer.

14. The device of claim 10, wherein the device is a camera.

15. The device of claim 10, wherein the device is a mouse.

16. A method of operating a sensor for range finding and ambient light measurement wherein the sensor includes an array of pixels capable of sensing illumination in a plurality of wavelengths and generating a response thereto for each wavelength; the sensor further including an ambient light sensing system; wherein the method comprises the step of adjusting the response from the ambient light sensor, such that the response for each wavelength is independent of the wavelength of the illumination; wherein the step of adjusting the response comprises:
   calculating a difference between a first and second response generated by the array of pixels at different wavelengths to produce a first output;
   calculating a ratio of the first and second responses to produce a second output; and
   multiplying the first and second outputs to normalize the first and second responses such that they are independent of the wavelength of the illumination.

17. The method of claim 16, further comprising applying gain and offset to the ratio of the first and second responses to produce the second output.

18. The method of claim 16, further comprising generating each of the first and second responses of the ambient light sensor with illumination at different wavelengths.

19. The method of claim 18, further comprising generating an output wherein the first and second responses are substantially similar for similar levels of illumination irrespective of the wavelength of the illumination.

20. A sensor, comprising:
   a first pixel configured to sense illumination in a first wavelength and generate a first response signal;
   a second pixel configured to sense illumination in a second wavelength and generate a second response signal;
   an adjustment circuit comprising:
      a subtraction circuit configured to determine a difference between the first and second response signals to produce a first output signal;

a dividing circuit configured to determine a ratio of the first and second response signals to produce a second output signal; and a multiplying circuit configured to multiply the first and second output signals to generate a normalized output signal independent of the wavelength of the illumination.

21. The sensor of claim 20, further comprising an interpolation circuit configured to applying a gain and an offset to the ratio of the first and second response signals in producing the second output signal.

22. The sensor of claim 20, wherein the first and second pixels are single photon avalanche diodes.

23. The sensor of claim 22, wherein the single photon avalanche diodes comprise IR responsive single photon avalanche diodes.

24. The sensor of claim 22, wherein the single photon avalanche diodes comprise visual light responsive single photon avalanche diodes.

25. The sensor of claim 22, wherein at least one of the single photon avalanche diodes is attenuated.

26. The sensor of claim 20, wherein the first and second wavelengths are different.

* * * * *